(12) United States Patent
Takahashi et al.

(10) Patent No.: US 6,491,142 B2
(45) Date of Patent: Dec. 10, 2002

(54) BRAKE DISK

(75) Inventors: Kyo Takahashi, Saitama (JP); Masahiro Yoshida, Saitama (JP); Hisayoshi Kageyama, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/820,917

(22) Filed: Mar. 30, 2001

(65) Prior Publication Data

US 2001/0045332 A1 Nov. 29, 2001

(30) Foreign Application Priority Data

Mar. 31, 2000 (JP) .......................................... 11-096460

(51) Int. Cl.$^7$ .............................................. F16D 65/12
(52) U.S. Cl. .............................................. 188/218 XL
(58) Field of Search ........................ 188/218 A, 218 R, 188/218 XL

(56) References Cited

U.S. PATENT DOCUMENTS 4,742,948 A * 5/1988 Fisher et al. ............. 188/251 A
5,620,042 A * 4/1997 Ihm ............................. 164/95
5,626,211 A * 5/1997 Gewelber et al. ............ 188/218
6,032,769 A * 3/2000 Daudi .................. 188/218 XL
6,086,688 A * 7/2000 Doutre et al. ......... 188/218 XL
6,088,906 A * 7/2000 Hsu et al. ...................... 29/598

FOREIGN PATENT DOCUMENTS

| DE | 2 108 950 | 2/1971 |
| GB | 1 290 645 | 9/1972 |
| JP | 58091936 | 6/1983 |
| JP | 59062738 | 4/1984 |
| JP | 08226478 A | 9/1996 |
| JP | 09042339 A | 2/1997 |
| JP | 2557898 | 8/1997 |

* cited by examiner

Primary Examiner—Christopher P. Schwartz
(74) Attorney, Agent, or Firm—Birch, Stewart, Kolasch & Birch, LLP

(57) ABSTRACT

A brake disk having a disk body formed of a titanium alloy, and inner and outer friction members formed of a stainless steel and bonded to opposite surfaces of the disk body by a brazing method is disclosed. The friction members can be simply bonded to the opposite surfaces of the disk body in a manner that provides a lightweight brake disk while simultaneously suppressing cost.

16 Claims, 6 Drawing Sheets

(a)

(b)

(c)

BRAKE DISK

BACKGROUND OF THE INVENTION

1. Field of the Invention

The present invention relates to a brake disk, more particularly to a brake disk which brake pads are pressed against for braking.

2. Background Art

A conventional disk brake for a motorcycle has a brake disk and brake pads which are pressed against the opposite surfaces (friction members) of the brake disk for braking. Some lightweight brake disks have disk bodies formed of a lightweight material, and friction members of a highly frictional material are attached to the opposite surfaces of their respective disk body.

An exemplary disk brake disclosed in Japanese Application No. JP-A No. H8-226478 has a lightweight brake disk as aforementioned. Friction parts are formed in this type of arrangement by fixing frictional material to the opposite surfaces of the disk body of the brake disk. The formation of the friction parts with frictional material enables the formation of a lightweight brake disk from a light aluminum alloy.

However, some types of brake disks need friction parts requiring a greater thickness. Another exemplary brake disk of the conventional art is disclosed in Japanese Patent Application No. JP-A No. H9-42339. This type of brake disk is provided with thick frictional members. This type of arrangement bonds friction members formed from an alloy steel to the opposite surfaces of an aluminum disk by explosive cladding.

However explosive cladding is an expensive, complex and time consuming process. Explosive cladding processes require the troublesome steps of putting an alloy steel member on an aluminum member, mounting a buffer on the alloy steel member, putting a proper amount of explosive on the buffer, and detonating the explosive by a detonator attached to one end of the explosive.

An exemplary disk rotor of the conventional art is disclosed in Japanese Utility Model No. 2557898. In this type of arrangement, a brake disk is provided with a thick frictional member. This arrangement incorporates a plate-shaped member of a carbon-fiber-reinforced composite material positioned between a pair of metal plates forming a disk rotor. The pair of metal plates and the plate-shaped member are joined together by riveting.

However, a process for uniting together the pair of metal plates and the plate-shaped member requires a step of forming a plurality of through holes in the pair of metal plates and the plate-shaped member, and an additional step of pressing down the ends of a plurality of rivets. Thus, this technique requires additional parts, additional fabrication steps and ultimately increased manufacturing/assembly costs.

The conventional art arrangements are not practically suited for mass production in which a member formed of a titanium alloy or an aluminum alloy and member formed of an iron-base material are bonded together.

The explosive cladding method proposed in JP-A No. H9-42339 and the rivet bonding method disclosed in Japanese Utility Model No. 2557898 increase the manufacturing costs of the brake disk. Accordingly, manufacturing techniques that will replace these known techniques would be advantageous to the related art.

SUMMARY OF THE INVENTION

The present invention overcomes the shortcomings associated with the related art and achieves other advantages not realized by the related art.

An aspect of the present invention to provide techniques capable of reducing the weight of a brake disk by bonding together a member of a titanium alloy or an aluminum alloy, and a member formed of an iron-base member.

An additional aspect of the present invention is to provide an inexpensive disk brake.

These and other aspects are accomplished by a brake disk comprising a disk body formed of a titanium alloy or an aluminum alloy; and friction members formed of an iron-based material and bonded to opposite surfaces of the disk body by brazing.

These and other aspects are further accomplished by a brake disk for mounting on a hub included in a wheel of a motorcycle, the brake disk comprising a disk body formed of a titanium alloy or an aluminum alloy, the disk body having an inner surface and an outer surface; and a pair of friction members formed of an iron-base material and bonded to the inner surface and the outer surface of the disk body by a respective brazing layer; wherein the pair of friction members has an inner friction member and an outer friction member, the inner friction member having a thickness $t3$ different from a thickness $t5$ of the outer friction member.

These and other aspects are further accomplished by a method of forming a brake disk, the method comprising the steps of positioning a first friction member between a plurality of pins attached to a support plate of a jig; applying a first brazing metal filler layer to the first friction member; positioning a first surface of a disk body over the brazing metal filler layer; applying a second brazing metal filler layer on a second surface of the disk body; positioning a second friction member over the second brazing metal layer; applying a pressure plate onto the second friction member; placing the jig holding the first and second friction members, support plate, first and second brazing metal filler layers, and disk body in a vacuum vessel; applying a load to the pressure plate; and heating an interior atmosphere of the vacuum vessel to a predetermined brazing metal activation temperature for a predetermined period of time.

In order to achieve the aforementioned objects, a brake disk stated in a first aspect of the invention comprises a disk body formed of a titanium alloy or an aluminum alloy, and friction members formed of an iron-base material and bonded to the opposite surfaces of the disk body by brazing.

Prior to the present invention, there has not been any practical technique suitable for mass production of disk brakes including a member of a light titanium alloy or aluminum alloy having a high strength, and a member of an iron-base material. According to the present invention, the disk body is formed of a light titanium alloy or aluminum alloy having a high strength, and friction members formed of an iron-base material are bonded together by brazing. The use of a light titanium alloy or aluminum alloys having a high strength reduces the weight of the brake disk.

The friction members are bonded to the disk body by brazing. The friction members can be bonded to the disk body simply by forming a brazing filler metal layer between each of the friction members and the disk body and melting the brazing filler metal layer.

As is generally known, when a brake disk is incorporated into a motorcycle, the outer surface of the brake disk opposite the inner surface of the same facing the wheel of the motorcycle is exposed more efficiently to running wind than the inner surface. Therefore, when a braking force is exerted on the brake disk, the inner friction member facing the wheel is heated at a temperature higher than that at which the outer friction member is heated. In addition, friction coefficient between the friction member and a brake pad decreases as the temperature of the friction member rises. Therefore, it is important to maintain the friction members at a fixed temperature.

Moreover, the pair of friction members are formed having respectively different thicknesses. The thicker friction member is bonded to the inner surface of the disk body facing the wheel and the thinner friction member is bonded to the outer surface of the disk body. The thicker friction member bonded to the inner surface of the disk body on the side of the wheel is capable of absorbing a large amount of heat generated when a braking force is applied to the brake disk. Thus, the inner friction member facing the wheel and the outer friction member not facing the wheel can be maintained at substantially the same temperature. Consequently, the disk body is capable of absorbing a large amount of heat generated when a braking force is applied to the brake disk.

Thus, the inner friction member facing the wheel and the outer friction member facing away from the wheel are maintained at the same relative temperature. Consequently, both the friction coefficient associated with the inner friction member and the friction coefficient associated with the outer friction member can be held on a substantially fixed level.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Hereinafter, the present invention will be described in detail with reference to the accompanying drawings.

Figure 1:
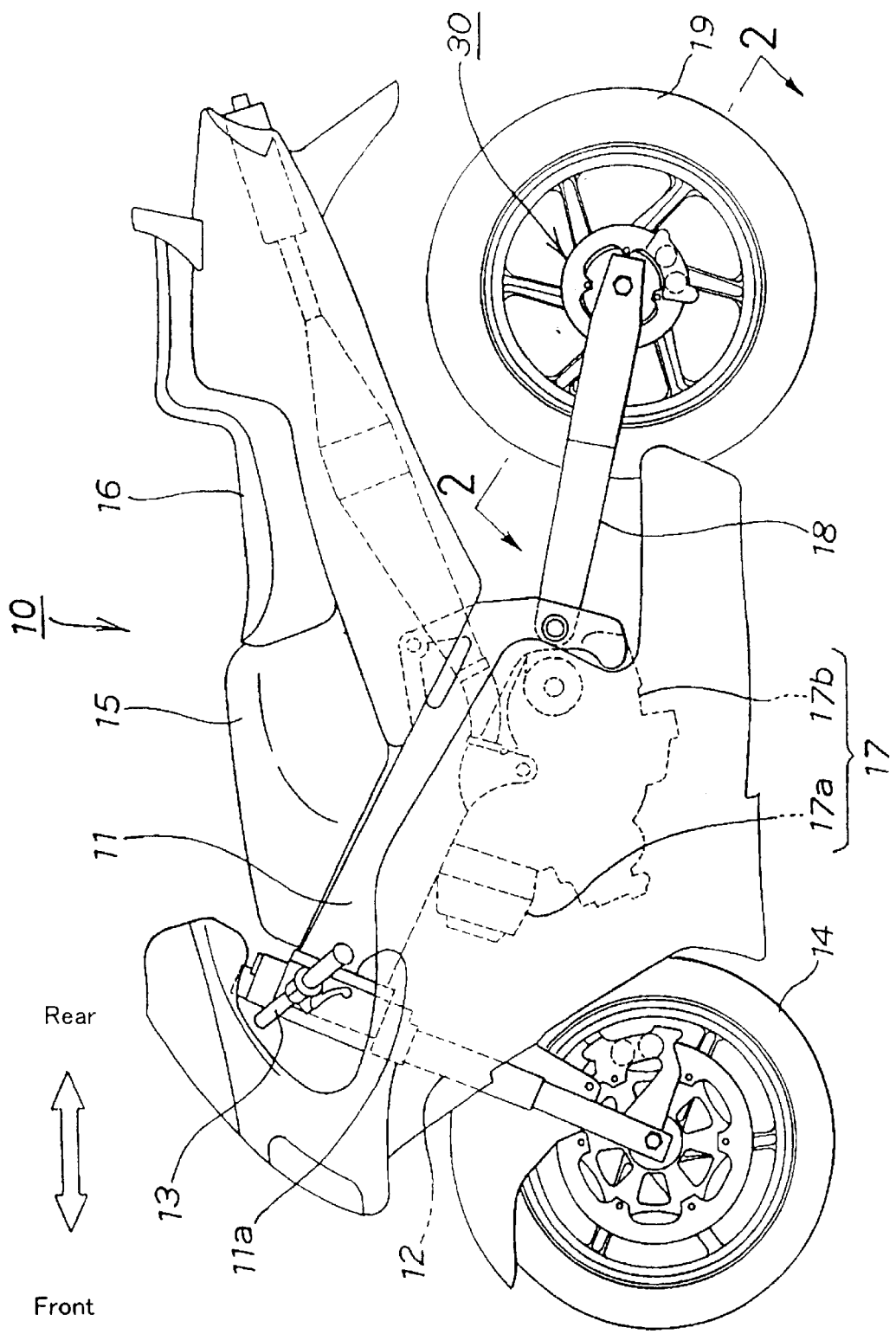
FIG. 1 is a side elevation of a motorcycle employing a brake disk according to a first embodiment of the present invention.

In the following description, the terms "front", "back", "right" and "left" are indicative of directions as seen from the perspective of an operator of a vehicle. FIG. 1 is a side elevation of a motorcycle employing a brake disk according to a first embodiment of the present invention.

A motorcycle 10 having a body frame 11 is shown in FIG. 1. The motorcycle 10 includes a front fork 12 supported in a head pipe 11a, a handlebar 13 attached to an upper end of the front fork 12, a front wheel 14 attached to a lower end of the front fork 12, and a fuel tank 15 mounted on a front part of the body frame 11. A seat 16 is mounted on a portion of the body frame positioned behind the fuel tank 15.

A power unit 17 (formed by combining an engine 17a and a transmission 17b) is disposed under and attached to a front part of the body frame 11 of the motorcycle 10. Swing arms 18 are pivotally joined for swinging to a rear part of the body frame 11, and a rear wheel 19 is supported on a rear end part of the swing arm 18. As seen in FIG. 1, the rear wheel 19 is provided with a brake disk 30 in a preferred embodiment according to the present invention.

Figure 2:
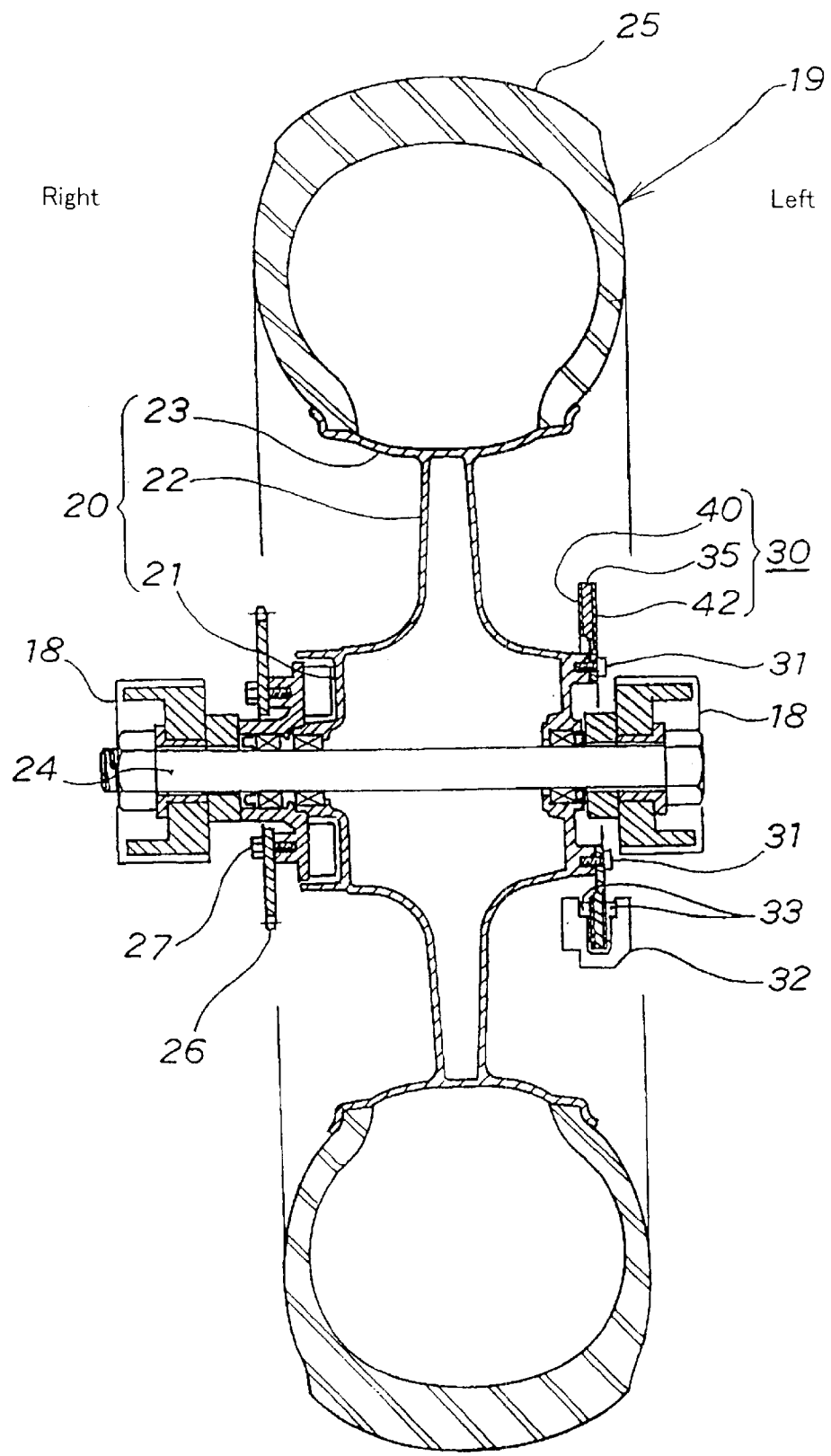
FIG. 2 is a sectional view taken along line 2—2 in FIG. 1.

The brake disk 30 of the present invention will be described hereinafter. FIG. 2 is a sectional view taken on line 2—2 in FIG. 1. As seen in FIG. 2, a wheel 20 includes a hub 21, a spoke 22 and a rim 23. The wheel 20 is disposed between the swing arms 18 and is supported for rotation by a rear axle 24 attached to the swing arms 18. A tire 25 is fitted on the rim 23. A sprocket 26 is fastened to the right side surface of the hub 21 with bolts 27. A drive chain, not shown, is wound around the sprocket 26 for transmitting a drive force to the wheel 20.

The brake disk 30 is fastened to a left side surface of the hub 21 with bolts 31. A caliper 32 is combined with a lower part of the brake disk 30 and is attached to the body of the motorcycle 10 (FIG. 1). Brake pads 33 are held on the caliper 32 so as to face an inner friction member 40 and an outer friction member 42 of the brake disk 30, respectively.

The brake pads 33 held on the caliper 32 are pressed against the inner friction member 40 and the outer friction member 42, respectively, to exert a braking force to the brake disk 30.

Figure 3:
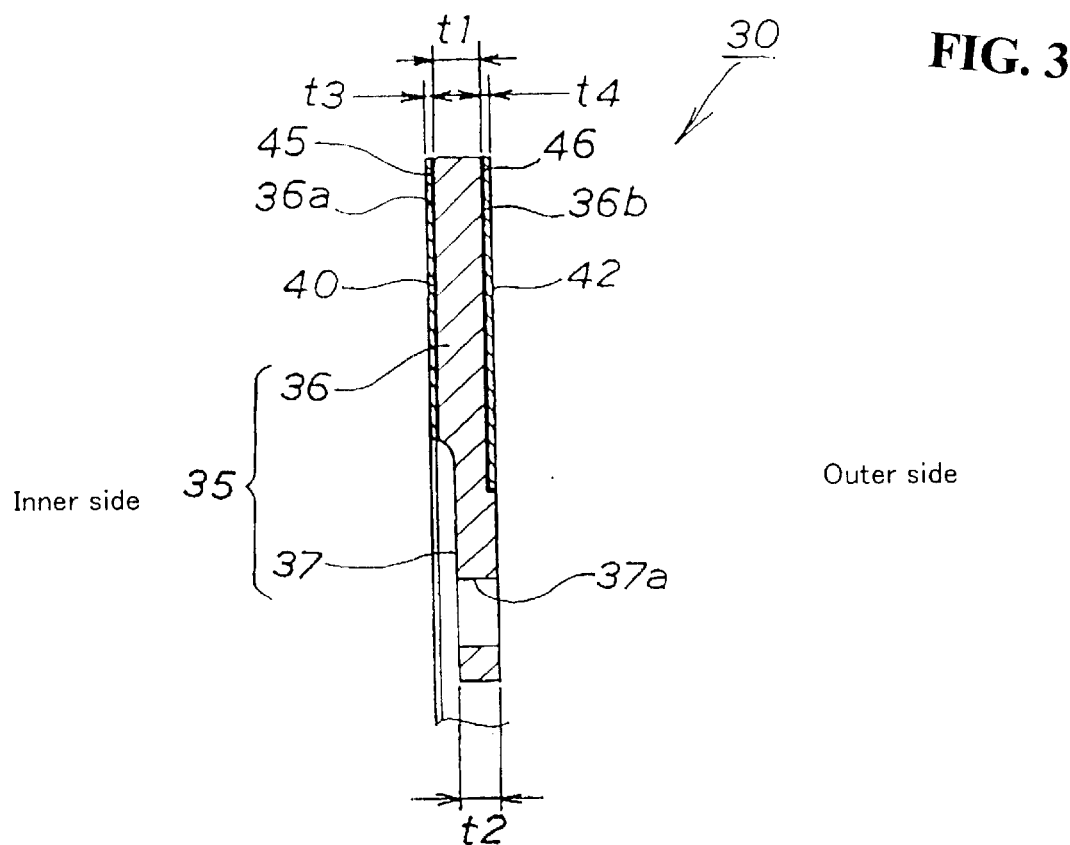
FIG. 3 is a sectional view of a brake disk according to the first embodiment of the present invention.

FIG. 3 is a sectional view of a brake disk according to the first embodiment of the present invention.

The brake disk 30 has a disk body 35 formed of a titanium alloy. An inner friction member 40 is formed of a stainless steel and is bonded by brazing to an inner surface 36a, i.e., a surface facing the wheel 20, of the brake disk 35. An outer friction member 42 is formed of a stainless steel and is bonded by brazing to the outer surface 36b, i.e., a surface opposing (not facing) the wheel 20.

The disk body 35 has an annular portion 36 having a thickness t1 and mounting lugs 37 having a thickness t2 provided with a through hole 37a and formed integrally with the annular portion 36. The mounting lugs 37 are formed so as to project radially inward from an inner circumference of the annular portion 36. The disk body 35 is formed of a titanium alloy and is provided with a recess in the inner surface 36a facing the wheel 20. Although it is preferable that the titanium alloy contains 6% aluminum and 4% vanadium, the titanium alloy may be of any other composition.

The inner friction member 40 is bonded to the inner surface 36a facing the wheel 20 of the annular portion 36 with a brazing filler metal layer 45. The outer friction member 42 is bonded to the outer surface 36b of the annular portion 36 with a second brazing filler metal layer 46. The surface of the outer friction member 42 is flush with the outer surface of the disk body 35.

The inner friction member 40 is formed of a stainless steel, such as SUS410M, JIS, in a shape substantially the same as that of the inner surface 36a of the annular portion 36. The thickness t3 of the inner friction member 40 is preferably in the range of 0.3 to 0.5 mm, but the thickness is not limited thereto.

The outer friction member 42 is formed of a stainless steel, such as SUS410M, JIS, in a shape substantially the same as that of the outer surface 36b of the disk body 35. The thickness t4 of the outer friction member 42 is preferably in the range of 0.3 to 0.5 mm as with the inner friction member 40, but the thickness is not limited thereto.

The inner brazing filler metal sheet 45 and the outer brazing filler metal sheet 46 are formed of an activated silver solder containing 70% silver, 28% copper and 2% titanium in a preferred embodiment. However, the inner brazing filler metal sheet 45 and the outer brazing filler metal sheet 46 may be formed of any suitable material other than the activated silver solder that may be used in the present invention.

Figure 4:
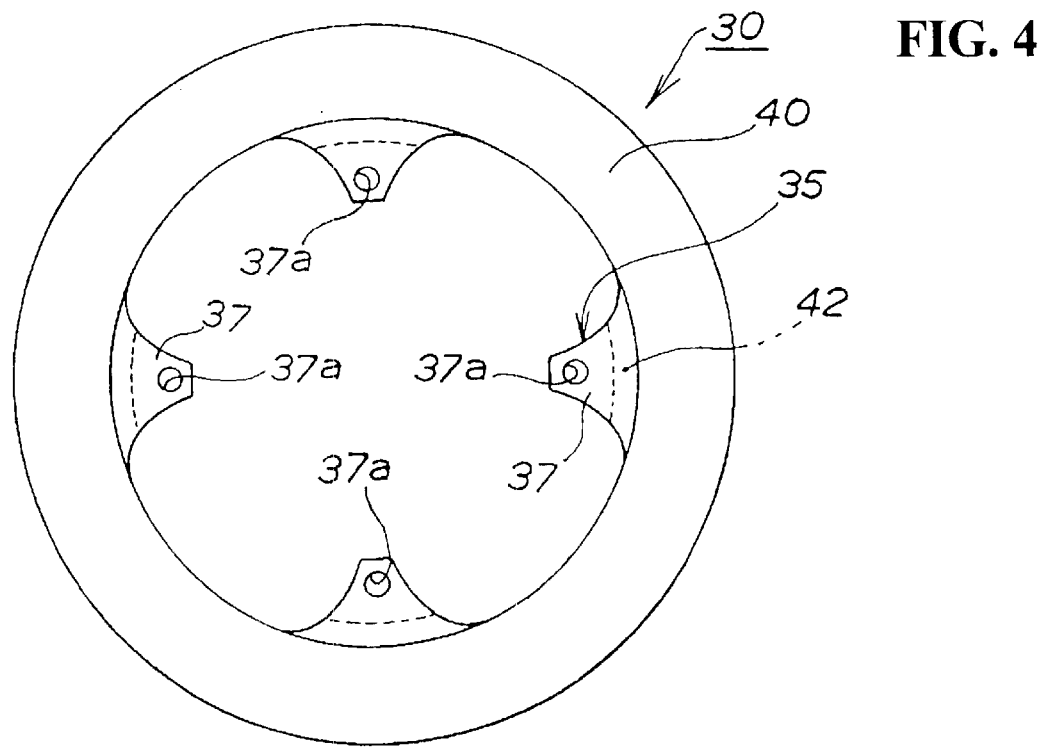
FIG. 4 is a plan view of a brake disk according to the first embodiment of the present invention.

FIG. 4 is a plan view of the brake disk 30 as viewed from the side of the wheel 19 (FIG. 2) according to an embodiment of the present invention. The annular inner friction member 40 is bonded to the inner surface 36a (FIG. 3) of the disk body 35 by brazing, and the annular outer friction member 42 is bonded to the outer surface 36b (FIG. 3) by brazing to form the brake disk 30.

As seen in FIG. 2, bolts 31 are passed through the through holes 37a (FIG. 3) of the brake disk 30 and are screwed into threaded holes formed in the hub 21 so as to fasten the brake disk 30 to the hub 21.

A relationship between the friction coefficient associated with the brake disk 30 and the weight of the brake disk 30 will be described in detail hereinafter with reference to Table 1.

TABLE 1

Friction Coefficient versus Brake Disk Weight

| | Material | Friction coefficient ($\mu$) | Weight |
|---|---|---|---|
| Comparative Example 1 | Stainless steel | 0.5 | W |
| Comparative Example 2 | Titanium alloy | 0.2–0.7 | 0.6 W |
| Comparative Example 3 | Aluminum alloy | 0.3 | 0.3 W |
| Exemplary Embodiment | Titanium alloy and stainless steel | 0.5 | 0.7 W |

A brake disk according to Comparative Example 1 is formed of a stainless steel, a brake disk according to Comparative Example 2 is formed of a titanium alloy, and a brake disk according to Comparative Example 3 is formed of an aluminum alloy. An Exemplary Embodiment is a brake disk according to an embodiment of the present invention. The weight of each brake disk is represented by a multiple of the weight W of the brake disk of Comparative Example 1.

Comparative Example 1 has a friction coefficient of 0.5 and a weight of W. Although the friction coefficient is large, the weight of Comparative Example is large as well.

Comparative Example 2 has a friction coefficient varying across the range of 0.2 to 0.7 and a weight of 0.6W. Although the weight is desirably smaller, the resulting friction coefficient varies throughout this range and it is therefore difficult to produce a stable, reliable braking force.

Comparative Example 3 has a friction coefficient of 0.3 and a weight of 0.3W. The weight, similar to that of Comparative Example 2, is small enough, but the friction coefficient is small, and it is therefore difficult to produce a sufficient braking force.

The Exemplary Embodiment has a friction coefficient of 0.5 and a weight of 0.7W. Accordingly, the friction coefficient is large enough and the weight is satisfactorily small.

The brake disk in the first embodiment has the disk body 35 formed of a light titanium alloy having a high strength, and the friction members 40 and 42 respectively formed of the different iron-base materials are bonded to the opposite surfaces of the disk body 35 by brazing. Accordingly, the bonding of members of different materials by brazing enables the use of the light titanium alloy having a high strength for forming the disk body 35. This arrangement enables the brake disk 30 to be formed in a lightweight structure.

Figure 5:
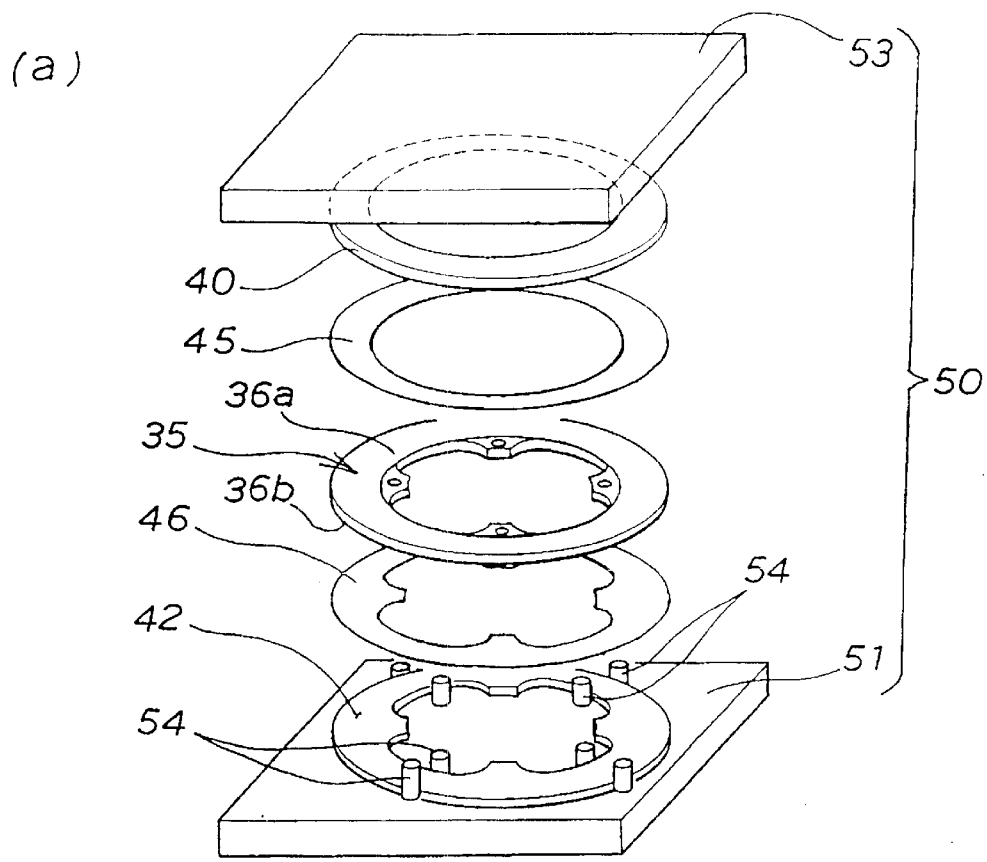
FIG. 5a is an exploded view of fabrication steps of a brake disk according to an embodiment of the present invention.
FIG. 5b is a side view of fabrication steps of a brake disk according to an embodiment of the present invention.
FIG. 5c is a side view of fabrication steps of a brake disk according to an embodiment of the present invention.
Figure 5:
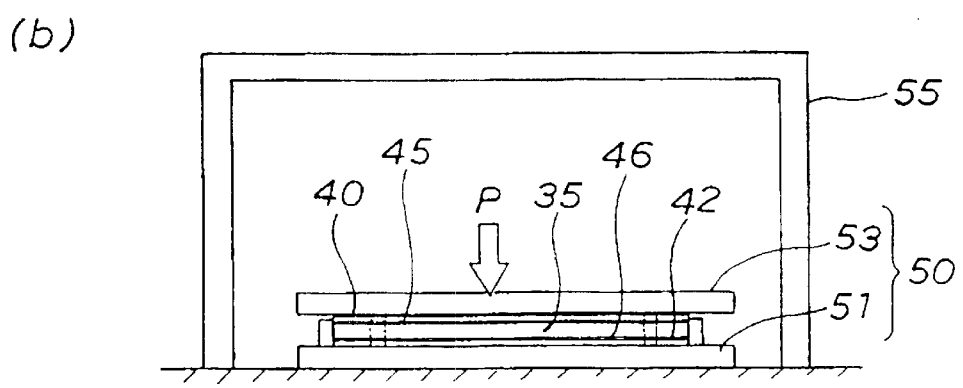
Figure 5:
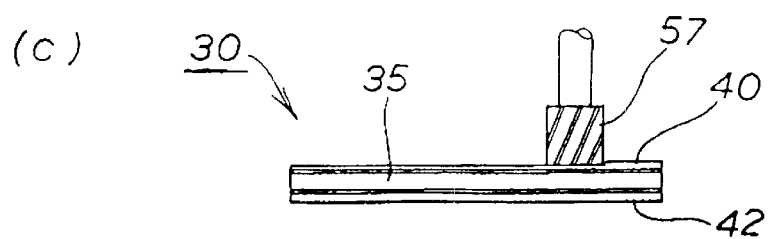

A brazing method employed in fabricating the brake disk 30 will be described hereinafter. FIGS. 5(a) to 5(c) show various fabrication steps of an exemplary brazing method employed in fabricating the brake disk 30 according to an embodiment of the present invention.

In a step shown in FIG. 5(a), a brazing jig 50 having a support plate 51 and a pressure plate 53 is prepared. An outer friction member 42 is located between a plurality of pins 54 attached to the support plate 51, and an outer brazing filler metal sheet 46, the disk body 35, an inner brazing filler metal sheet 45 and the inner friction member 40 are superposed in that order onto the outer friction member 42. Then, the pressure plate 53 is placed on the inner friction member 40.

Preferably, the thicknesses of workpieces for forming the inner friction member 40 and the outer friction member 42 is slightly greater than a desired thickness of the inner friction member 40 and the outer friction member 42, and more particularly in the range of 0.3 to 0.5 mm to provide the workpieces with a grinding allowance/tolerance.

Preferably, the inner brazing filler metal sheet 45 has a shape similar to that of the inner friction member 40 and a thickness of approximately 100 $\mu$m. However, the shape and the thickness of the inner brazing filler metal sheet 45 are not limited thereto. Similarly, the outer brazing filler metal sheet 46 has a shape similar to that of the outer friction member 42 and a thickness of approximately 100 $\mu$m. However, the shape and the thickness of the inner brazing filler metal sheet 46 are not limited thereto.

The inner brazing filler metal sheet 45 and the outer brazing filler metal sheet 46 may be substituted by powder.

In a step shown in FIG. 5(b), the jig 50 holding the outer friction member 42, the outer brazing filler metal sheet 46, the disk body 35, the inner brazing filler metal sheet 45 and the inner friction member 40 are placed in a vacuum vessel 55. A load P of about 2 kg is applied in the direction of the blank arrow (designating load P) to the pressure plate 53 in order to effectively apply a pressure of 0.01 kgf/cm$^2$ to surfaces to be bonded together by brazing.

Subsequently, the vacuum vessel 55 is evacuated to a vacuum of 1.5 torr, and then the interior atmosphere of the vacuum vessel 55 is heated at 850° C. for 40 min to melt the inner brazing filler metal sheet 45 and the outer brazing filler metal sheet 46. Consequently, the inner friction member 40 is bonded to the inner surface 36a of the disk body 35 by the molten inner brazing filler metal sheet 45 and the outer friction member 42 is bonded to the outer surface 36b (FIG. 3) of the disk body 35 by the molten outer brazing filler metal sheet 46.

The aforementioned brazing method loads the pressure plate 53 with the load P of about 2 kg to prevent the deformation of the inner friction member 40 and the outer friction member 42. The outer friction member 42, the outer brazing filler metal sheet 46, the disk body 35, the inner brazing filler metal sheet 45 and the inner friction member 40 are positioned by the pins 54 to prevent the dislocation of those members during brazing and to further safeguard accurate positioning of components.

The brazing method permits the bonding together of members of different materials, such as a member of a titanium alloy and a member of an iron-base material. Thus, the disk body 35 can be formed by a light titanium alloy having a high strength, which is effective in reducing the weight of the brake disk 30.

In a step shown in FIG. 5(c), the surfaces of the inner friction member 40 and the outer friction member 42 bonded to the disk body 35 are machined with a cutting tool 57 to finish the surfaces of the inner friction member 40 and the outer friction member 42 to a machined surface required of the brake disk 30. The thickness of the thus finished friction members 40 and 42 is preferably in the range of 0.3 to 0.5 mm.

If the surfaces of the inner friction member 40 and the outer friction member 42 as bonded to the disk body 35 have a certain degree of flatness required of the brake disk 30, the same surfaces do not need to be finished by machining.

In the first embodiment, the friction members 40 and 42 are bonded to the disk body 35 by the aforementioned brazing method. The friction members 40 and 42 can be easily bonded to the disk body 35 simply by spreading a brazing filler metal between the friction members 40 and 42, and the disk body 35, and heating the brazing filler metal to its activation temperature.

A brake disk according to a second embodiment of the present invention will be described hereinafter.

The brake disk in the second embodiment has a disk body formed of an aluminum alloy, and friction members formed of a stainless steel and bonded to the disk body by brazing. Thus, the brake disk in the second embodiment is the same as the brake disk 30 in the first embodiment except that the former has the disk body formed of the aluminum alloy.

Figure 6:
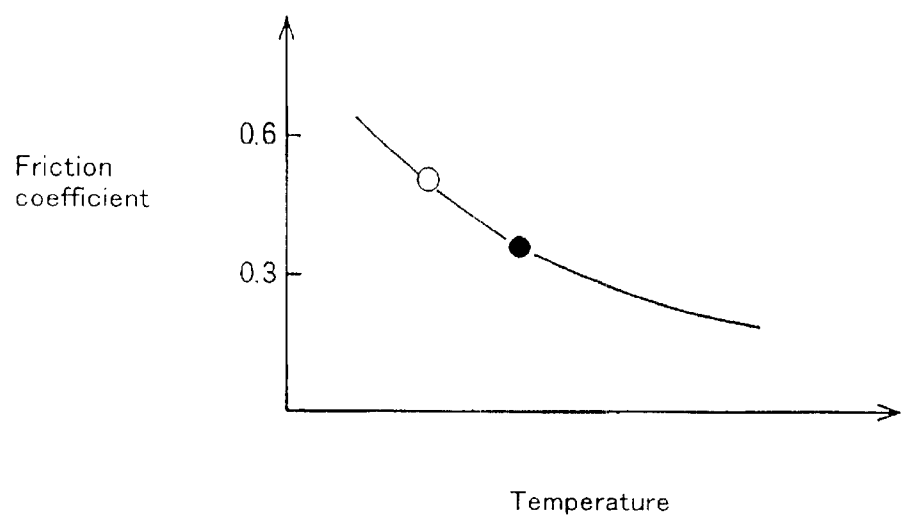
FIG. 6 is a graphical view showing the variation of a friction coefficient with respect to temperature associated with a friction member of a brake disk according to a second embodiment of the present invention.

FIG. 6 is a graph showing the variation of the friction coefficient associated with the friction member of the brake disk in the second embodiment with the temperature of the same, in which friction coefficient associated with the friction member is measured on the vertical axis and the temperature of the friction member is measured on the horizontal axis. A solid circle designates a brake disk in the Comparative Example 1 and a blank circle designates the brake disk in the Exemplary Embodiment. The brake disk in Comparative Example 1 has a disk body integrally provided with friction parts and formed of a stainless steel. The brake disk in the Exemplary Embodiment is the brake disk in the second embodiment.

The stainless steel has a heat transfer coefficient of about 0.18 cal/cm·s·° C. and the aluminum alloy has a heat transfer coefficient of about 0.53 cal/cm·s·° C. Accordingly, the heat transfer coefficient of the aluminum alloy is as great as about three times that of the stainless steel.

The temperature of the friction member and the friction coefficient associated with the friction member were measured by rotating the brake disk at a predetermined rotational speed, and pressing brake pads against the rotating brake disk for braking.

It was found that heat generated in the friction member of the brake disk in Comparative Example 1 by a braking action could not be transferred at a high rate to the disk body. Therefore, if the braking action continues for a long time, the temperature of the friction member rises and the friction coefficient decreases slightly as indicated by a solid circle. Although this brake disk in Comparative Example 1 is satisfactory in braking effect, an even more effective braking disk has been desired.

Since the disk body of the brake disk in the second embodiment is formed of the aluminum alloy, heat generated in the friction member during braking can be satisfactorily absorbed by the disk body. Therefore, even if large braking energy is produced, the temperature rise of the friction member can be suppressed as indicated by a blank circle. Consequently, the friction coefficient remains substantially constant and a sufficient braking force can be produced.

Moreover, the brake disk in the second embodiment, similarly to that in the first embodiment, can be formed in a lightweight structure, which is effective in improving the performance of the vehicle, such as a motorcycle.

Figure 7:
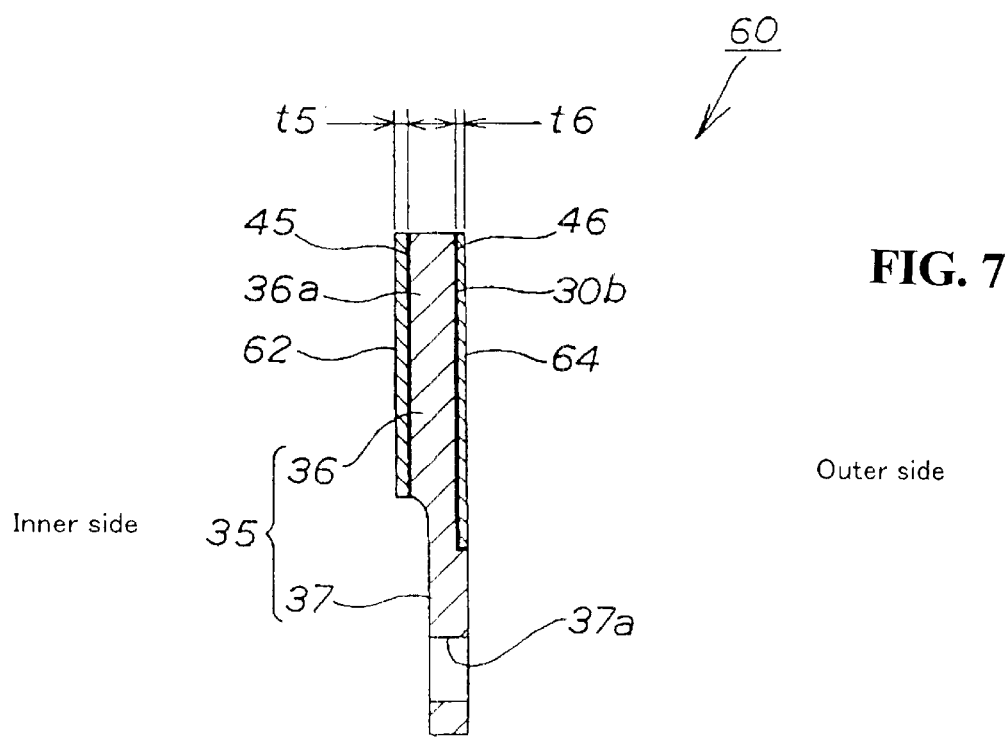
FIG. 7 is a sectional view of a brake disk according to a third embodiment of the present invention.

A brake disk according to a third embodiment of the present invention will be described with reference to FIG. 7. FIG. 7 is a sectional view of a brake disk according to the third embodiment of the present invention FIG. 7.

As seen in FIG. 7, a brake disk 60 has a disk body 35 formed of a titanium alloy, an inner friction member 62 and an outer friction member 64. The inner friction member 62 and the outer friction member 64 are bonded by brazing to the inner surface 36a of the disk body 35 on the side of a wheel and an outer surface 36b of the disk body 35 opposite the inner surface 36a, respectively.

The inner friction member 62 is bonded to the inner surface 36a of an annular portion 36 by an inner brazing filler metal layer 45 and the outer friction member 64 is bonded to the outer surface 36b of the annular portion 36 by an outer brazing filler metal layer 46. The surface of the outer friction member 64 is flush with the surface of the outer surface of the disk body 35.

The inner friction member 62 is formed of a stainless steel, such as SUS410M, JIS, in a shape substantially the same as that of the inner surface 36a of the annular portion 36. Preferably, the thickness t5 of the inner friction member 62 is in the range of 0.3 to 0.5 mm, but the thickness is not limited thereto.

The outer friction member 64 is formed of a stainless steel, such as SUS410M, JIS, in a shape substantially the same as that of the outer surface 36b of the disk body 35. Preferably, the thickness t6 of the outer friction member 64 is, similarly to that of the inner friction member 62, in the range of 0.3 to 0.5 mm, but the thickness is not limited thereto.

The thickness t5 of the inner friction member 62 of the brake disk 60 varies from the thickness t6 of the outer friction member 64 of the brake disk 60. More specifically, the inner friction member 62 has a greater thickness than the outer friction member 64. The brake disk 60 is attached to the hub 21 of the wheel 19 of the motorcycle 10 shown in FIG. 1 with the thicker friction member 62 facing the wheel 19. The thinner friction member 64 (thinner with respect to friction member 62) faces outwardly so as to be more aerodynamically exposed to running wind/air streams than the larger cross-sectional area of the thicker friction member 62 would be in a similar position.

The inner friction member 62 and the outer friction member 64 are the same in construction as the inner friction member 40 and the outer friction member 42 of the first embodiment, respectively, except that the inner friction member 62 and the outer friction member 64 have different thickness t5 and t6, respectively.

As generally known, when the brake disk 60 is incorporated into the motorcycle 10 shown in FIG. 1, the outer surface of the brake disk 60, i.e., the outer friction member 64, is exposed more efficiently to running wind than the inner surface of the same, i.e., the inner friction member 62.

Therefore, when a braking force is exerted on the brake disk 60, the inner friction member 62 is heated at a temperature higher than that at which the outer friction member 64 is heated. Friction coefficients associated with the inner friction member 62 and the outer friction member 64 decrease as the temperatures of the inner friction member 62 and the outer friction member 64 rise. Therefore, it is important to maintain the friction members at a fixed temperature.

In order to achieve these fixed temperatures, the inner friction member 62 is formed having a thickness t5 greater than the thickness t6 of the outer friction member 64. Accordingly, the thicker inner friction member 62 is capable of absorbing a large amount of heat generated when a braking force is applied to the brake disk 60. Thus, the inner friction member 62 and the outer friction member 64 can be maintained at substantially the same temperature even though the inner friction member 62 is exposed to moving airstreams/running wind less efficiently than the outer friction member 64.

Consequently, both the friction coefficient associated with the inner friction member 62 and the friction coefficient associated with the outer friction member 64 can be held at a substantially fixed level. The same braking force can be substantially produced on the opposite sides of the brake disk 60.

Figure 8:
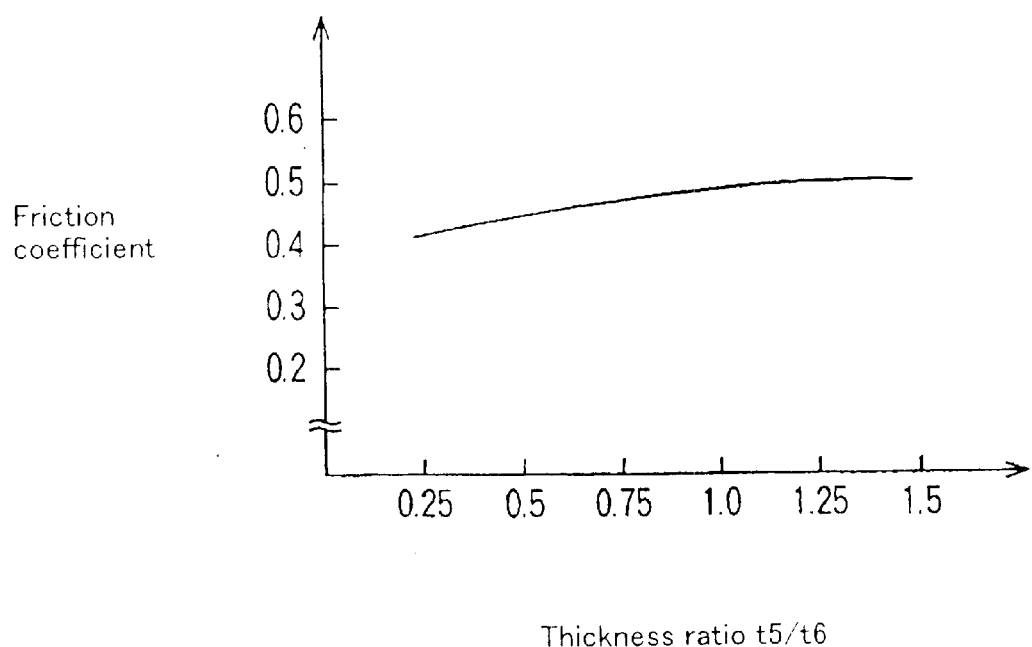
FIG. 8 is a graphical view showing the relation between a friction coefficient associated with a brake disk and a thickness of friction members according to the third embodiment of the present invention.

The influence of the thickness of the friction member on friction coefficient will be explained with reference to FIGS. 7 and 8. FIG. 8 is a graph showing the relation between friction coefficient associated with the brake disk in the third embodiment and the thickness of the friction members, in which the mean of the friction coefficients respectively associated with the friction members 62 and 64 is measured on the vertical axis and the thickness ratio t5/t6, i.e., the ratio of the thickness t5 of the inner friction member 62 to the thickness t6 of the outer friction member 64, is measured on the horizontal axis.

Friction coefficients were measured under measuring conditions that are more severe than those for the measurement of the friction coefficients shown in Table 1 associated with the brake disks in the first embodiment and those in the comparative examples. This was done in order to elucidate the effect of the difference in thickness between the inner and the outer friction member on the difference in friction coefficient. Accordingly, the values of the friction coefficients are different from those shown in Table 1.

Friction coefficients respectively associated with the opposite surfaces of the brake disk are 0.41 when the thickness ratio t5/t6 is 0.25, i.e., when the thickness t5 of the inner friction member 62 is ¼ of the thickness t6 of the outer friction member 64. Friction coefficients respectively associated with the opposite surfaces of the brake disk are 0.43 when the thickness ratio t5/t6 is 0.5, i.e., when the thickness t5 of the inner friction member 62 is ½ of the thickness t6 of the outer friction member 64.

Friction coefficients respectively associated with the opposite surfaces of the brake disk are 0.46 when the thickness ratio t5/t6 is 0.75, i.e., when the thickness t5 of the inner friction member 62 is ¾ of the thickness t6 of the outer friction member 64. Friction coefficients respectively associated with the opposite surfaces of the brake disk are 0.48 when the thickness ratio t5/t6 is 1.0, i.e., when the thickness t5 of the inner friction member 62 is equal to the thickness t6 of the outer friction member 64.

Friction coefficients respectively associated with the opposite surfaces of the brake disk are 0.49 when the thickness ratio t5/t6 is 1.25, i.e., when the thickness t5 of the inner friction member 62 is 1.25 times the thickness t6 of the outer friction member 64. Friction coefficients respectively associated with the opposite surfaces of the brake disk are 0.5 when the thickness ratio t5/t6 is 1.5, i.e., when the thickness t5 of the inner friction member 62 is 1.5 times the thickness t6 of the outer friction member 64.

As obvious from the graph shown in FIG. 8, friction coefficients respectively associated with the opposite surfaces of the brake disk are 0.46, which are fairly satisfactory, when the thickness t5 of the inner friction member 62 is equal to the thickness t6 of the outer friction member 64.

Friction coefficients respectively associated with the opposite surfaces of the brake disk can be increased beyond 0.46 when the thickness t5 of the inner friction member 62 is greater than the thickness t6 of the outer friction member 64. Particularly, when the thickness t5 of the inner friction member 62 is 1."t" times the thickness 5t of the outer friction member 64, friction coefficients associated with the opposite surfaces of the brake disk are as large as 0.5.

The respective disk bodies of the brake disks in the first and the third embodiment are formed of the titanium alloy. Those disk bodies may also be formed of a light material having a high rigidity other than the titanium alloy, such as titanium, aluminum, an aluminum alloy or the like.

The disk body of the brake disk in the second embodiment is formed of an aluminum alloy. However, this disk body may be formed of a material having a large heat transfer coefficient, such as aluminum.

Although the friction members of the foregoing embodiments are formed of the stainless steel, the friction members may be formed of an iron-base material other than the stainless steel, such as a carbon steel or cast iron, provided that the iron-base material is capable of forming friction members having a frictional property represented by a satisfactory friction coefficient.

In the third embodiment, the inner friction member 62 facing the wheel is thick and the outer friction member 64 not facing the wheel is comparatively thinner. However, the inner friction member 62 may be alternatively thin and the outer friction member 64 may alternatively thicker.

The present invention forms friction parts by attaching a frictional material to a brake disk by spraying or physical application. The thickness of the friction parts is in the range of about 10 to about 20 µm.

In the brake disk stated according to one embodiment, the disk body is formed of the titanium alloy or the aluminum alloy, and the friction members formed of the iron-base material are bonded to the opposite surfaces of the disk body by brazing. The disk body formed of the light titanium alloy or aluminum alloy reduces the weight of the brake disk.

The friction members are bonded to the disk body by the brazing method. The disk body is formed of the titanium alloy or the aluminum alloy, the friction members are formed of the iron-base material, and the brazing filler metal is sandwiched between the disk body and the friction members. The disk body and the friction members are formed of different materials, respectively, and the friction members can be bonded to the disk body simply by melting the brazing filler metal, which reduces the cost of the brake disk.

In the brake disk according to a second embodiment, the disk body is formed of the titanium alloy or the aluminum alloy, and the friction members formed of the iron-base material are bonded to the opposite surfaces of the disk body by brazing. The titanium alloy or the aluminum alloy is a light material having a high strength and further reduces the weight of the brake disk.

Moreover, the pair of friction members are formed having respectively different thicknesses. The thicker friction member is bonded to the inner surface of the disk body facing the wheel and the thinner friction member is bonded to the outer surface of the disk body. The thicker friction member bonded to the inner surface of the disk body on the side of the wheel is capable of absorbing a large amount of heat generated when a braking force is applied to the brake disk. Thus, the inner friction member facing the wheel and the outer friction member not facing the wheel can be maintained at substantially the same temperature. Consequently, the disk body is capable of absorbing a large amount of heat generated when a braking force is applied to disk.

Thus, the inner friction member facing the wheel and the outer friction member facing away from the wheel are maintained at the same relative temperature. Consequently, both the friction coefficient associated with the inner friction member and the fiction coefficient associated with the outer friction member can be held on a substanially fixed level.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A brake disk comprising:
   a disk body formed of a titanium alloy or an aluminum alloy;
   friction members formed of an iron-based material and bonded to opposite surfaces of the disk body by brazing; and
   brazing members inserted between said disk body and said friction members, wherein said brazing members have a shape substantially the same as a shape of said friction members.

2. The brake disk according to claim 1, wherein said disk body has an annular portion and a plurality of mounting lugs, said mounting lugs formed integrally with said annular portion.

3. The brake disk according to claim 2, wherein said mounting lugs project radially inward from an inner circumference of said annular portion.

4. The brake disk according to claim 3, wherein said mounting lugs include at least one through hole for accommodating fasteners.

5. A brake disk comprising:
   a disk body formed of a titanium alloy or an aluminum alloy;
   friction members formed of an iron-based material and bonded to opposite surfaces of the disk body by brazing, wherein said friction members include an inner friction member and an outer friction member;
   an inner brazing metal layer inserted between said disk body and said inner friction member; and
   an outer brazing metal layer inserted between said disk body and said outer friction member, wherein said brazing members have a shape substantially the same as a shape of said friction members.

6. The brake disk according to claim 5, wherein said disk body has an annular portion and a plurality of mounting lugs, said mounting lugs formed integrally with said annular portion.

7. The brake disk according to claim 6, wherein said mounting lugs project radially inward from an inner circumference of said annular portion.

8. The brake disk according to claim 7, wherein said mounting lugs include at least one through hole for accommodating fasteners.

9. The brake disk according to claim 8, wherein said disk body is formed of a titanium alloy containing 6% aluminum and 4% vanadium by weight, said inner and outer friction members are formed of SUS410M stainless steel, and said inner and outer brazing metal layers are formed of an activated silver solder.

10. The brake disk according to claim 5, wherein said inner brazing metal layer and said outer brazing metal layer include a brazing metal layer sheet.

11. The brake disk according to claim 5, wherein said inner brazing metal layer and said outer brazing metal layer include a brazing powder-based metal layer.

12. A brake disk for mounting on a hub included in a wheel of a motorcycle, said brake disk comprising:
   a disk body formed of a titanium alloy or an aluminum alloy, said disk body having an inner surface and an outer surface; and
   a pair of friction members formed of an iron-base material and bonded to the inner surface and the outer surface of the disk body by a respective brazing layer having substantially the same shape as said friction members; wherein the pair of friction members has an inner friction member and an outer friction member, said inner friction member having a thickness t3 different from a thickness t5 of said outer friction member.

13. The brake disk according to claim 12, wherein said disk body is formed of a titanium alloy containing 6% aluminum and 4% vanadium by weight, said inner and outer friction members are formed of SUS410M stainless steel, and said brazing metal layers are formed of an activated silver solder.

14. A method of forming a brake disk, said method comprising the steps of:
   positioning a first friction member between a plurality of pins attached to a support plate of a jig;
   applying a first brazing metal filler layer to said first friction member;
   positioning a first surface of a disk body over said brazing metal filler layer, wherein said disk body is formed of a titanium alloy containing 6% aluminum and 4% vanadium by weight;
   applying a second brazing metal filler layer on a second surface of said disk body;
   positioning a second friction member over said second brazing metal layer, wherein said first and second friction members are formed of SUS410M stainless steel;
   applying a pressure plate onto said second friction member;
   placing the jig holding the first and second friction members, support plate, first and second brazing metal filler layers, and disk body in a vacuum vessel, wherein said brazing metal filler layers are formed of an activated silver solder containing 70% silver, 28% copper and 2% titanium by weight;

applying a load to said pressure plate; and heating an interior atmosphere of said vacuum vessel to a predetermined brazing metal activation temperature for a predetermined period of time, wherein said predetermined activation temperature is approximately 850° C. and said predetermined period of time is forty minutes.

15. The method according to claim 14, wherein said load effectively applies a pressure of at least 0.01 kgf/cm$^2$ to said first and second surfaces of said disk body.

16. A method of forming a brake disk, said method comprising the steps of:

positioning a first friction member between a plurality of pins attached to a support plate of a jig;

applying a first brazing metal filler layer to said first friction member, wherein said first brazing metal filler layer has substantially the same shape as said first friction member;

positioning a first surface of a disk body over said brazing metal filler layer, wherein said disk body is formed of a titanium alloy;

applying a second brazing metal filler layer on a second surface of said disk body;

positioning a second friction member over said second brazing metal layer, wherein said second brazing metal filler layer has substantially the same shape as said second friction member;

applying a flat pressure plate onto said second friction member;

placing the jig holding the first and second friction members, support plate, first and second brazing metal filler layers, and disk body in a vacuum vesselt;

applying a load to said pressure plate; and heating an interior atmosphere of said vacuum vessel to a predetermined brazing metal activation temperature for a predetermined period of time.

\* \* \* \* \*